Patented May 1, 1951

2,550,767

UNITED STATES PATENT OFFICE 2,550,767

MANUFACTURE OF POLYMERIC UREAS

Gerard Dunstan Buckley and Neil Hunter Ray, Northwich, England, assignors to Imperial Chemical Industries Limited, a corporation of Great Britain No Drawing. Application November 18, 1947, Serial No. 786,802. In Great Britain November 29, 1946

10 Claims. (Cl. 260—77.5)

This invention relates to a new process for the manufacture of polycondensation products, more particularly of polymeric ureas suitable for the manufacture of films and fibres.

We have found that polyamines, and especially primary diamines, can be reacted with carbon dioxide at an elevated temperature and pressure to give polycondensation products which are polymeric ureas, and that the degree of polymerisation depends on the pressure used. We have also found that these polymeric ureas are of especially high molecular weight if provision is made during the reaction for removal of water vapour. Furthermore, the products of this process are new materials which, when they have a high intrinsic viscosity, are highly suitable for the manufacture of films and fibres.

According to this invention we manufacture polycondensation products by a process which comprises subjecting a polyamine and carbon dioxide to an elevated temperature preferably between 100° and 350° C. and a pressure exceeding 100 atmospheres.

The polyamines are generally aliphatic or cycloaliphatic compounds having at least two primary amine groups, and the carbon chain may include substituent groups or may be interrupted by other atoms or groups such as —O—, —S— and —NH—. The preferred compounds are diamines containing 6–14 carbon atoms, and by using these diamines we obtain polymeric ureas which have a low enough melting point for use as thermoplasts in processes such as spinning. Suitable polyamines are hexamethylenediamine, decamethylenediamine, octamethylenediamine, γ,γ'-diaminopropyl ether, ethyleneglycol bis-γ-aminopropyl ether, diethylenetriamine and γ,γ'-diaminopropyl sulphide.

The pressure used has an influence on the degree of polymerisation of the product, and as a highly polymerised product such as one having a molecular weight of the order of magnitude 10,000, i. e. an intrinsic viscosity of between 0.4 and 0.8, is desirable for manufacturing threads, the pressure used should generally be 200–800 atmospheres. Much higher pressures can be used if desired, even up to 10,000 atmospheres and higher. At low pressures only low molecular weight polymers are obtained; and although the required pressure depends inter alia on the diamine and the temperature, it exceeds 100 atmospheres. The preferred temperature is between 100° and 350° C. and generally between 150° and 300° C.

One method of carrying out the process of this invention is illustrated as a batch process. The polyamine such as decamethylenediamine is converted into its carbonate by melting it and bubbling carbon dioxide through the melt at atmospheric pressure until the smell of amine is no longer apparent. The carbonate may be solid or melted depending on the temperature of carbonation. If it is solid, some caking has generally occurred, and it is desirable to break it up into small particles. The carbonate is then put into a pressure vessel equipped with inlet and outlet valves, the vessel is closed, and the air present is displaced by carbon dioxide at an elevated pressure such as 100 atmospheres. The temperature is then raised to between 180° and 250° C., and more carbon dioxide is pumped in. When the pressure reaches 500 atmospheres, the outlet valve is opened slightly so that some carbon dioxide passes through the vessel and the pressure remains at about 500 atmospheres. These conditions are maintained for between 6 and 24 hours, and the vessel is then cooled and the pressure is released. The vessel is then opened and the solid product is removed.

The process may be carried out in two or more stages. It is convenient to preform the carbonate in the manner described above, and it is also convenient to carry out the subsequent treatment at high pressures in two stages. By stopping this treatment before the polymer has an intrinsic viscosity of 0.2, the polymer can be melted and easily removed from the vessel, and/or can be ground up easily into a free-flowing powder. The treatment is then continued at a temperature below the melting point of the polymer, and the product is thereby obtained as a free-flowing powder.

For the rapid production of polycondensation products of sufficiently high intrinsic viscosity to be useful in the spinning of good quality fibres, we have found that the reaction should be carried out in the substantially anhydrous condition and that the water liberated during the reaction should be removed. This can be done in several ways. One method is to employ dry carbon dioxide and to pass it through the reaction zone and thereby permit it to carry out the water vapour liberated. This is particularly suited to a continuous or semi-continuous process, and the carbon dioxide is dried and returned to the reaction zone. Another method is to use a liquid to take up the water, and for this purpose a liquid which has a high affinity for water but a low solvent power for the product is chosen, e. g. dioxane and phenyl glycide ether. A third method is to dry the vapour in situ, and this may be carried out by means of a dehydrating agent such as phosphorus pentoxide held in a drying tube in the vapour.

The effect of removing water by blowing it off with carbon dioxide was shown by a series of batch preparations in which those marked A were obtained without water removal, those marked B were obtained by intermittently blowing down to 100 atmospheres pressure and then adding more dry carbon dioxide, and those marked C were obtained by continuously feeding dry carbon dioxide and continuously blowing off to keep the pressure constant. With hexamethylenediamine and using 220° C. and 500 atmospheres, the intrinsic viscosities of the products after 2 hours were A, 0.15; B, 0.20; C, 0.44. After 20 hours A had an intrinsic viscosity of 0.62; after only 6 hours B had an intrinsic viscosity of 0.52; and after only 7 hours C had an intrinsic viscosity as high as 1.1. Similar behaviour was shown by decamethylenediamine and $\gamma,\gamma'$-diaminopropyl ether.

Although the process has been described and exemplified as a batch operation, we can carry it out as a continuous process and such a process offers obvious advantages for large scale manufacture. One method of operating a continuous process is to convert the amine into its carbonate by pre-treatment with carbon dioxide, and feed this, as a powder suspended in a fluid medium such as an organic liquid, or as a solution in a solvent, into a long high pressure tube. Conveniently it may be pumped with the carbon dioxide into one end of such a tube, wherein it is heated to 300° C. and maintained at 1500 atmospheres and the rate of flow is adjusted so that the desired product is obtained. In such a process a suitable reaction time is about 1 hour, but in continuous operation we can use higher temperautres without deleteriously affecting the properties of the product and thereby have quicker reaction rates. The product, still suspended or dissolved in the fluid medium, is withdrawn through a pressure release valve and separated. The separation may be carried out by filtering from the suspension, or by precipitation from the solution by adding a non-solvent such as water or alcohol, and then drying. Suitable solvents include phenol and m-cresol, and other liquids which may be used include benzene.

The products of this invention may be represented by the general formula $(NH.R.NH.CO)_x$ wherein R is any divalent organic radical and $x$ is an integer. It is difficult to determine the magnitude of $x$ because the products are insoluble in the solvents normally used for molecular weight determinations. One method of characterisation connected with the magnitude of $x$ is the intrinsic viscosity, defined as the Naperian logarithm of the ratio of the viscosity of a solution of the product to the viscosity of the solvent, per unit concentration, i. e.

$$\frac{\ln \eta}{c}$$

where $$\eta = \frac{\text{viscosity of solution}}{\text{viscosity of solvent}}$$

and $c$ = concentration in grams of solute per 100 grams of solution,

The measurement is usually carried out using a solution containing 0.5% of solute. We have shown that this method of characterisation is fundamentally important in defining those products which can be spun into strong fibres and cold drawn. The minimum intrinsic viscosity for good products is 0.3 and the preferred value lies between 0.4 and 0.8. Although the products can have higher intrinsic viscosities, such products require the use of excessive pressures in spinning.

Examples of the radical R in the general formula for the products of this invention are $—C_3H_6.O.C_3H_6—$, $—C_3H_6.O.CH_2.CH_2.O.C_3H_6—$, $—C_2H_4.NH.C_2H_4—$, $C_3H_6.S.C_3H_6—$, $—C_nH_{2n}—$ where $n$ is any integer from 6 to 10 inclusive, cyclohexylene, and complex radicals forming part of the diamines obtained by reacting ethylene dichloride with ammonia. Where two or more polyamines are used together, mixed products may be obtained wherein two different radicals are combined in the polycondensation product.

The products have a high softening temperaperature, 130°–300° C., above which they can be pressed into flexible transparent films, and can be cast into films from their solution in phenols. They can also be drawn into strong threads by melt spinning or solution spinning, and the threads can be cold drawn to strengthen them.

The invention is illustrated but not restricted by the following examples in which all parts are by weight.

*Example 1*

40 parts of pure hexamethylenediamine were charged into a stirred silver-lined reaction vessel and carbon dioxide was added to a pressure of 100 atmospheres. The vessel was heated to 200° C. and the pressure was raised to and maintained at 500 atmospheres by the addition of more carbon dioxide. After 22 hours the vessel was cooled and the pressure released, and the vessel opened. It was found to contain 55 parts of a white solid having a molecular weight of 4000, softening point 250° C., melting point 300° C., and soluble in hot phenol.

*Example 2*

30 parts of hexamethylenediamine carbonate were put into a reaction vessel equipped with inlet and outlet tubes. Dry carbon dioxide was introduced, with the outlet closed, and the vessel heated to 220° C., at which temperature the pressure in the vessel was 500 atmospheres. The outlet valve was then opened and gas was allowed to escape at a rate of 1 part by weight per minute while fresh dry carbon dioxide was added at such a rate that the pressure was maintained at 500 atmospheres. After 7 hours the vessel was cooled and opened. The product was 25 parts of a white solid, soluble in m-cresol, and had an intrinsic viscosity of 1.1. Its melting point was 300° C. and at this temperature it could be drawn into fibres.

*Example 3*

120 parts of decamethylenediamine carbonate were put into a reaction vessel similar to that used in Example 2, and treated in a similar manner with dry carbon dioxide at 200° C. and 500 atmospheres while bleeding gas off at a rate of 1 part by weight per minute, for 1 hour. The vessel was then cooled and opened and the intermediate low molecular weight polymer was removed and ground into a fine powder. This was returned to the vessel and the high pressure treatment was continued as before, at 200° C. and 500 atmospheres, for a further 13 hours. The product was 105 parts of a white solid soluble in m-cresol, and had an intrinsic viscosity of 0.66. Its melting point was 250° C. and when molten it could be drawn into fibres.

Example 4

10 parts of $\gamma,\gamma'$-diaminopropyl ether carbonate were put into a reaction vessel and dry carbon dioxide was added to a pressure of 100 atmospheres. The vessel was heated to 220° C., and the pressure was raised to 2000 atmospheres by adding more carbon dioxide. After 1 hour the pressure was released and immediately more carbon dioxide was pumped in to raise the pressure again to 2000 atmospheres. This operation of replacing the gas phase was repeated five times at hourly intervals, and then the vessel was cooled and the pressure released. The product was 7 parts of a nearly white solid having a melting point of 160° C. The molten product could be drawn into fibres.

Example 5

25 parts of hexamethylenediamine dissolved in 25 parts of m-cresol were treated with dry carbon dioxide in the manner described in Example 1, the pressure being 500 atmospheres and the temperature 250° C., for 24 hours. The vessel was then cooled and the pressure released, and the reaction mixture was added to 200 parts of alcohol, the product being thereby precipitated as a solid (20 parts).

What we claim is:

1. Process for the manufacture of polycondensation products which comprises reacting a polyamino compound selected from the group consisting of aliphatc and cycloaliphatic polyamines and carbonates thereof with carbon dioxide at a temperature above 100° C. and a pressure exceeding 100 atmospheres.

2. Process as claimed in claim 1 wherein the reaction is carried out at a temperature between 150° C. and 300° C.

3. Process as claimed in claim 1 wherein the polyamino compound employed is a diamine.

4. Process as claimed in claim 1 wherein the reaction is carried out in a continuous manner.

5. Process as claimed in claim 1 wherein the reaction is carried out in a continuous manner by passing the polyamino compound and carbon dioxide continuously through a hot reaction zone, continuously withdrawing the resulting mixture from the reaction zone while releasing the pressure of said mixture and thereafter separating the condensation product from said mixture.

6. Process as claimed in claim 5 wherein the carbon dioxide from said mixture is recycled after separation of the condensation product.

7. Process as claimed in claim 1 in which the pressure is between 200 and 1000 atmospheres.

8. Process as claimed in claim 1 carried out under substantially anhydrous conditions with means for removing water vapour liberated during the process.

9. Process as claimed in claim 1 in which the polyamino compound is a polyamine carbonate.

10. Process as claimed in claim 1 carried out in the presence of a liquid medium.

GERARD DUNSTAN BUCKLEY.
NEIL HUNTER RAY.

REFERENCES CITED

The following references are of record in the file of this patent:

UNITED STATES PATENTS

| Number | Name | Date |
| --- | --- | --- |
| 2,130,948 | Carothers | Sept. 20, 1938 |
| 2,145,242 | Arnold | Jan. 31, 1939 |